US008538488B2

(12) United States Patent
Cavanaugh et al.

(10) Patent No.: US 8,538,488 B2
(45) Date of Patent: *Sep. 17, 2013

(54) SYSTEMS, METHODS, AND COMPUTER READABLE MEDIA FOR PROVIDING INFORMATION RELATED TO VIRTUAL ENVIRONMENTS TO WIRELESS DEVICES

(75) Inventors: Craig Michael Cavanaugh, Raleigh, NC (US); Jacob Benjamin Balsley, IV, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 24 days.

This patent is subject to a terminal disclaimer.

(21) Appl. No.: 13/444,380

(22) Filed: Apr. 11, 2012

(65) Prior Publication Data
US 2012/0196576 A1    Aug. 2, 2012

Related U.S. Application Data

(63) Continuation of application No. 13/156,388, filed on Jun. 9, 2011, now Pat. No. 8,200,261, which is a continuation of application No. 12/036,354, filed on Feb. 25, 2008, now Pat. No. 7,979,056.

(51) Int. Cl.
H04B 1/38 (2006.01)
(52) U.S. Cl.
USPC ............... 455/566; 455/404.1; 455/456.1; 455/456.2; 455/550.1; 455/575.1; 455/404.2; 455/414.1; 455/414.2; 455/440; 455/448; 370/352
(58) Field of Classification Search
USPC ......... 715/757, 771, 773, 778, 706; 370/352; 455/456.1, 456.2, 550.1, 575.1, 414.2, 414.1, 455/418
See application file for complete search history.

(56) References Cited

U.S. PATENT DOCUMENTS

| 7,036,082 B1* | 4/2006 | Dalrymple et al. ........... 715/757 |
| 7,236,799 B2* | 6/2007 | Wilson et al. ............... 455/456.3 |
| 7,979,056 B2 | 7/2011 | Cavanaugh et al. |
| 2006/0019679 A1* | 1/2006 | Rappaport et al. ......... 455/456.5 |
| 2007/0173266 A1 | 7/2007 | Barnes, Jr. |
| 2011/0237225 A1 | 9/2011 | Cavanaugh et al. |

OTHER PUBLICATIONS

U.S. Official Action dated Nov. 8, 2010 in U.S. Appl. No. 12/036,354.
U.S. Notice of Allowance dated Mar. 14, 2011 in U.S. Appl. No. 12/036,354.
U.S. Official Action dated Sep. 27, 2011 in U.S. Appl. No. 13/156,388.
U.S. Notice of Allowance dated Jan. 27, 2012 in U.S. Appl. No. 13/156,388.

* cited by examiner

Primary Examiner — Kamran Afshar
Assistant Examiner — Shahriar Behnamian
(74) Attorney, Agent, or Firm — Hartman & Citrin LLC

(57) ABSTRACT

Methods, systems, and computer-readable media are disclosed for providing information related to virtual environments. One such method includes receiving user input identifying an event related to the virtual environment for which a notification is to be provided to a mobile wireless communication device. User input is also received identifying an output to be provided by the mobile wireless communication device in response to receipt of the notification. A determination is then made that the event related to the virtual environment has occurred. In response to determining that the event occurred, the mobile wireless communication device is provided with the notification, and the output identified by the user input is provided by the mobile wireless communication device.

18 Claims, 6 Drawing Sheets

SYSTEMS, METHODS, AND COMPUTER READABLE MEDIA FOR PROVIDING INFORMATION RELATED TO VIRTUAL ENVIRONMENTS TO WIRELESS DEVICES

CROSS-REFERENCE TO RELATED APPLICATIONS

This patent application is a continuation of and claims priority to U.S. patent application Ser. No. 13/156,388, now U.S. Pat. No. 8,200,261, entitled "Systems, Methods, And Computer Readable Media For Providing Information Related To Virtual Environments to Wireless Devices," filed Jun. 9, 2011, which is a continuation of U.S. Pat. No. 7,979,056, entitled "Systems, Methods, And Computer Readable Media For Providing Information Related To Virtual Environments to Wireless Devices," filed Feb. 25, 2008, which are herein incorporated by reference in their entireties.

BACKGROUND

This application relates generally to the field of telecommunications. More specifically, this application relates to systems and methods for providing information related to virtual environments.

There are a number of computer-based environments that are continuous in nature in that the status of the environment in relation to a particular user continues to change even when the user is not actively participating in the environment. Some of these computer-based environments are purely virtual in nature such that the environment is entirely based on computer-generated inputs. For example, SimCity™ is a city-building virtual environment which offers a simulated city environment in which the size and condition of a virtual city that a player builds continues to change while the player is involved in other activities. In addition, Second Life™ is a virtual world which allows users to interact with each other through avatars. In particular, a user's avatar may explore, meet other avatars, create and trade virtual property and services from one another, and participate in individual and group activities.

In addition to the purely virtual environments, some virtual environments combine computer-generated inputs with real world events. In particular, fantasy sports, such as Fantasy Football, allow a participant to draft, acquire, and trade a team of real-life players, such as real-life National Football League™ players, and to score points based on those players' statistical performances on the actual field.

Other virtual environments include a virtual embodiment and a physical embodiment. In particular, Webkinz™ includes a virtual environment known as Webkinz World™ and a physical embodiment in the form of a plush toy. The Webkinz™ plush toy comes with a code which can be used to access the Webkinz World™ which is a virtual environment where a user can adopt a virtual pet, care for and interact with the virtual pet, and interact with other users. For example, the Webkinz™ owner may provide virtual food to her virtual pet by providing appropriate user input via a Web browser.

Many players access a continuous computer-based environment several times a day to check on the status of the environment. For example, players may access simulation games to determine the status of and/or to interact with a Webkinz™ virtual pet or a SimCity™ virtual city. Accessing a virtual environment too many times during a given day can be time consuming and may interfere with a player's other activities, such as a player's job.

SUMMARY

Systems, methods, and computer program products for providing information related to virtual environments are disclosed. Exemplary embodiments include receiving user input identifying an event related to the virtual environment for which a notification is to be provided to a mobile wireless communication device. User input is also received identifying an output to be provided by the mobile wireless communication device in response to receipt of the notification. A determination is then made that the event related to the virtual environment has occurred. In response to determining that the event occurred, the mobile wireless communication device is provided with the notification, and the output identified by the user input is also provided by the mobile wireless communication device.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

The following detailed description is directed to methods, systems, and computer-readable media for providing information related to virtual environments. In the following detailed description, references are made to the accompanying drawings that form a part hereof, and which are shown by way of exemplary embodiments and implementations.

Figure 1:
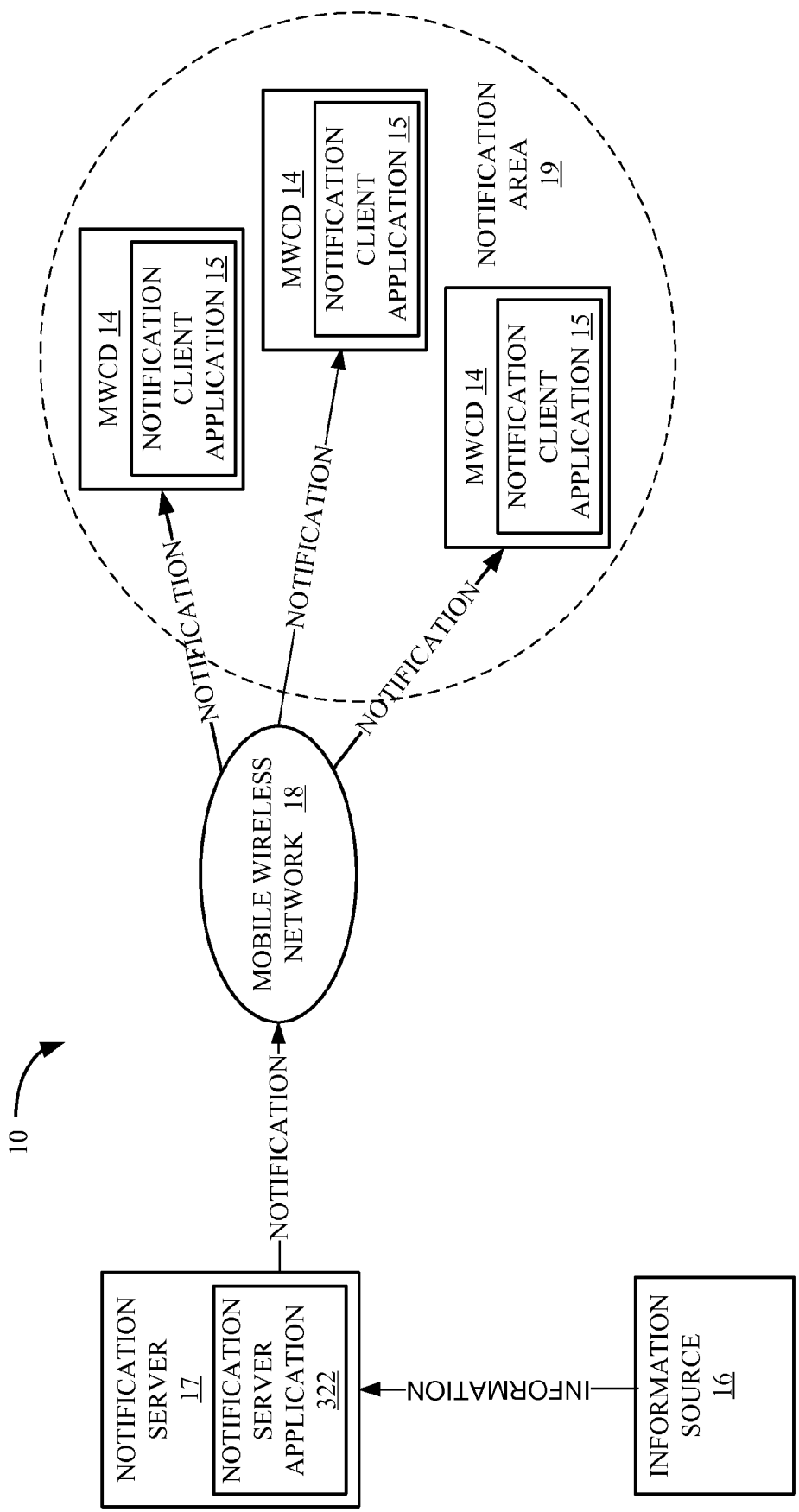
FIG. 1 is a block diagram illustrating a communication system comprising mobile wireless communication devices (MWCDs), in accordance with exemplary embodiments.

FIG. 1 is a block diagram illustrating a communication system 10, in accordance with exemplary embodiments. The communication system 10 includes a notification server 17, a mobile wireless network 18, and mobile wireless communication devices (MWCDs) 14. The MWCDs 14 are configured to communicate using a mobile wireless technology such as, for example, Global System for Mobile Communications (GSM) or Universal Mobile Telecommunications System (UMTS). Note that one or more of the MWCDs 14 may be dual mode user equipment (UE) capable of communicating via both a wireless local area network (LAN) technology (e.g., WiFi) and a mobile wireless technology. Note that although only three of the MWCDs 14 are shown in FIG. 1, there may be fewer or additional MWCDs 14 in a notification area 19. For example, there may be tens, hundreds, or even thousands of the MWCDs 14 in the notification area 19.

The MWCDs 14 may be located within the notification area 19 or remotely from each other. The notification area 19 may be determined based on, for example, an area within a particular distance from a certain object, premises, or location. The notification area 19 may additionally or alternatively correspond to a certain premises such as, for example, a shopping mall, a theme park, a hospital, a school, a building, or to a combination of premises. A determination as to whether the MWCD 14 user is within the notification area 19 may be based on a location technology such as, for example, global positioning system (GPS), Cell-ID, Enhanced Cell-ID, and/or time difference of arrival (TDOA).

According to exemplary embodiments, the notification server 17 provides notification to the MWCDs 14 via the mobile wireless network 18. The notification may be specific to a virtual character or environment of interest to the users of the MWCDs 14. For example, a notification may be sent regarding changes in status of a virtual character in a computer-implemented game. The MWCD 14 may receive different forms of communications from the notification server 17, including, but not limited to text messages, voice message, and electronic mail.

The notification server 17 may provide the MWCD 14 with notification that is based on information received by the notification server 17 from a remote source, such as an information source 16. The information source 16 may be, for example, a user computer, a server, a mobile phone, a personal digital assistant (PDA), or any other information source capable of providing the notification server 17 with information regarding a virtual character or environment.

According to exemplary embodiments, the notification provided by the notification server 17 may be based on whether the MWCD 14 is in the notification area 19. For example, if the MWCD 14 user has a stuffed animal that corresponds to a computer-enabled virtual pet for which the MWCD 14 user is registered, then the user may be notified regarding events, places, or people in the notification area 19 that are relevant to the user's computer-enabled virtual pet. As a more specific example, the notification server 17 may notify the MWCD 14 user that another MWCD 14 user registered as having another computer-enabled virtual pet is currently in the notification area 19.

In accordance with exemplary embodiments, the notification server 17 tracks the location of the MWCD 14 to determine if the MWCD 14 is within the notification area 19. The notification server 17 may also determine whether the MWCD 14 is associated with a virtual environment. If the notification server 17 determines that the MWCD 14 is associated with a virtual environment, then the notification server 17 determines whether other devices, such as other MWCDs 14, located in the notification area 19 are also associated with the virtual environment. A back office server (BOS) (not shown in FIG. 1) may provide the notification server 17 with contact information for the other MWCDs 14. The notification server 17 includes a notification server application 322 for providing notifications, described in detail below.

Figure 2:
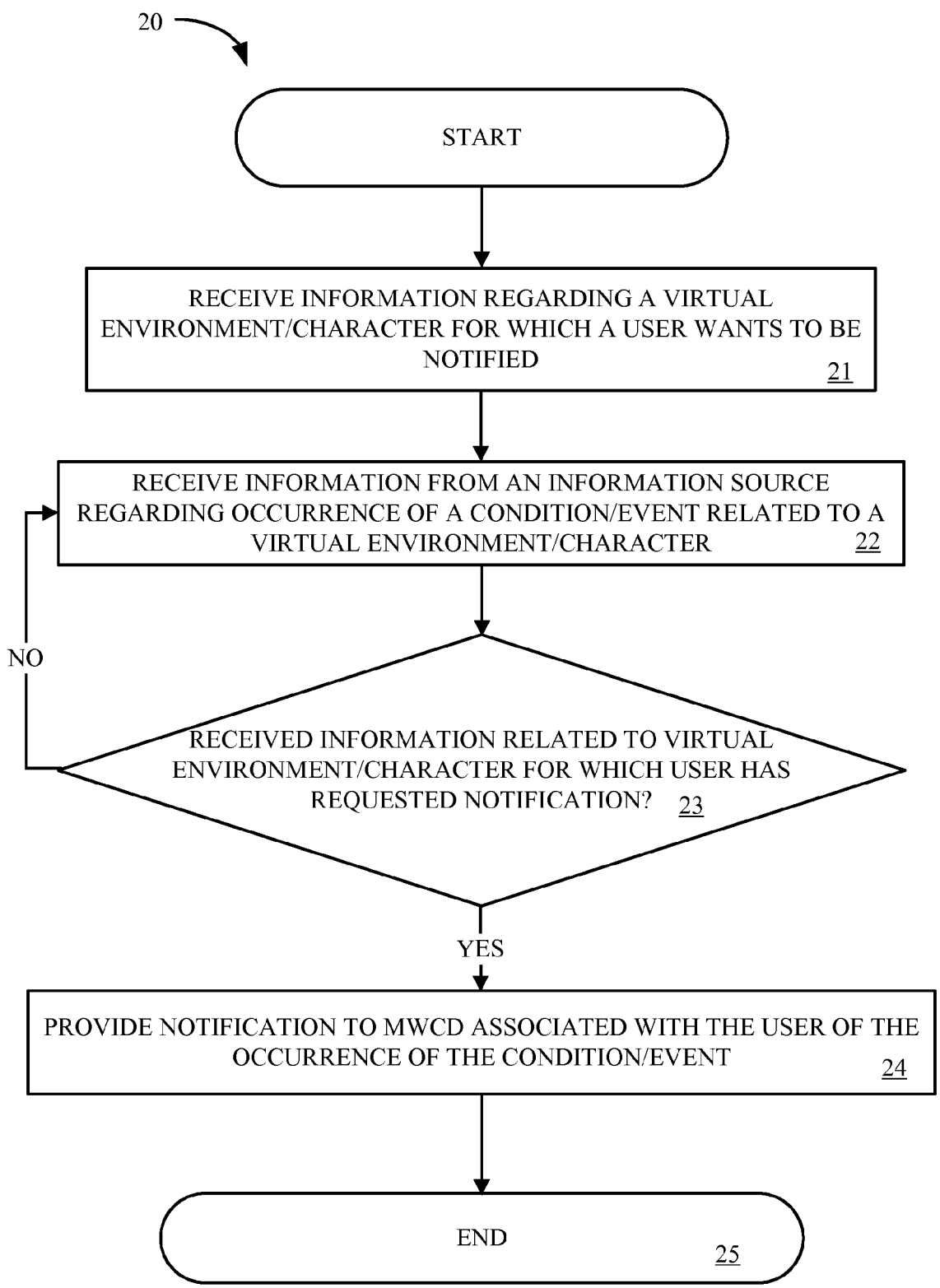
FIGS. 2-4 are flow charts illustrating exemplary methods for notifying a user of a MWCD that an event or condition associated with a virtual environment or character has occurred.
Figure 5:
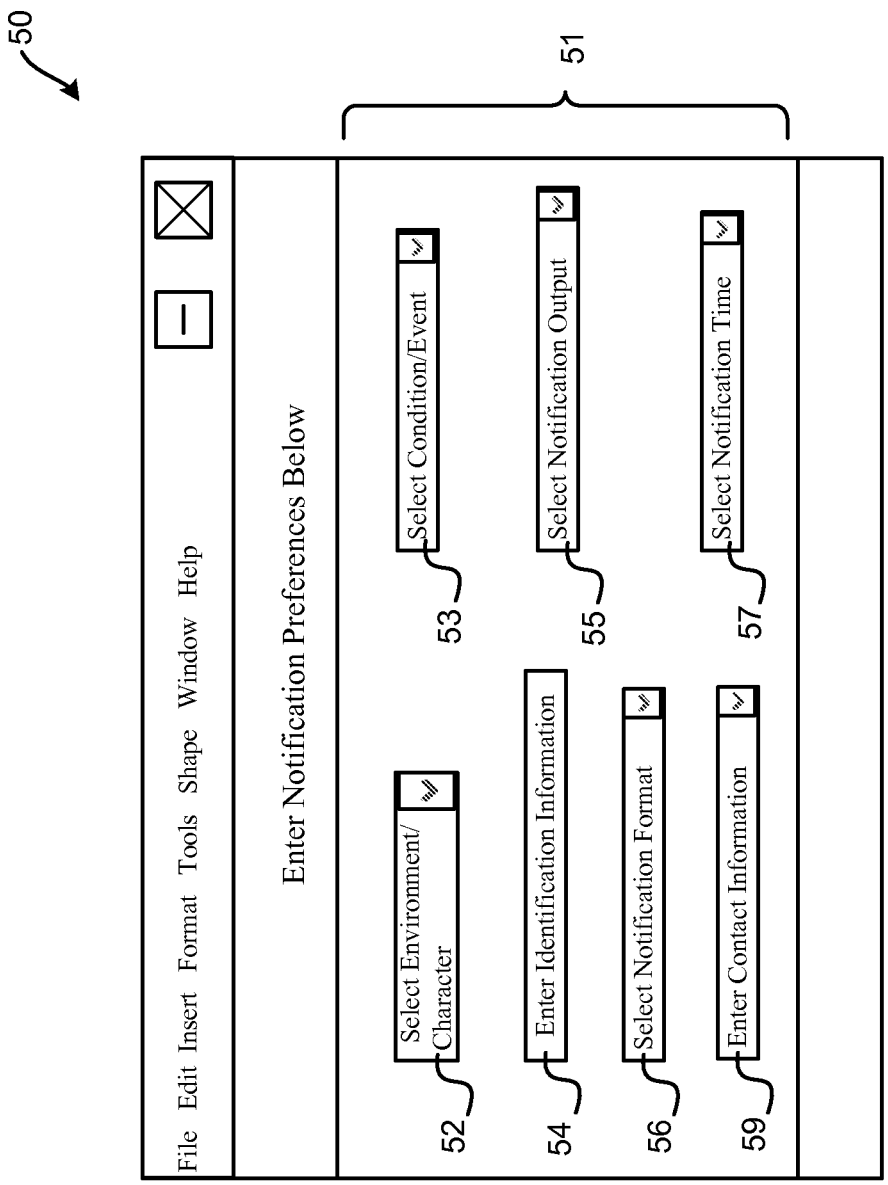
FIG. 5 is a diagram illustrating an exemplary embodiment of a graphical user interface for receiving user input related to notification to be provided to a MWCD.

FIG. 2 is a flow chart illustrating a method 20 for enabling notification specific to a virtual environment/character (e.g., a computer-implemented game), according to exemplary embodiments. As indicated at step 21, the notification server 17 receives information regarding conditions or events related to a virtual environment/character for which a user of the MWCD 14 would like to be notified. The MWCD 14 user may define conditions or events related to a virtual environment/character under which the user is to be notified using a graphical user interface 50 as illustrated in FIG. 5 and described further herein. The MWCD 14 user may also identify a type of output that the MWCD should provide when a notification related to a particular virtual environment/character associated with the MWCD is received from the notification server 17 using the graphical user interface 50. For example, the user may choose to be notified when players are being traded in the user's Fantasy Football league and may choose that the MWCD 14 of the user flash a particular color, such as red, when such notifications are received from the notification server 17. As discussed above, Fantasy Football is a game in which users select actual football players from a certain football league to be included in their respective Fantasy Football teams. Alternately, or in addition, the user may choose to be notified when a virtual natural disaster, such as flooding, occurs in a SimCity™ game environment, or when a virtual version of a toy, such as Webkinz™, needs some form of attention such as feeding, playing with, or exercising. The notification server 17 may store the received information regarding virtual environment/character conditions or events for which a user of the MWCD 14 has requested to be notified and the types of outputs to be provided by the MWCD in response to the notifications in a mass storage device 310 of the notification server or in a database located remotely from the notification server.

From step 21, the method 20 proceeds to step 22, where the notification server 17 receives information regarding the occurrence of conditions or events related to a virtual environment/character from the information source 16. The information source 16 may either be configured to host the virtual environment/character or may be configured to receive information regarding the virtual environment/character from another source such as a server or a user computer. For example, the notification server 17 may receive information that a specific player in a user's Fantasy Football league is traded, that a flood has damaged a user's virtual building in the SimCity™ game, or that the virtual version of a Webkinz™ needs feeding. The notification server 17 may, for example, provide a request to the information source 16 for information regarding any occurrence of the user-defined conditions or events associated with the virtual environment/character. The request provided by the notification server 17 may include information identifying the conditions or events for which a user of the MWCD 14 desires notification and identification information associated with the user and/or the MWCD 14 of the user. Additionally or alternatively, the information source 16 may provide information regarding occurrences of conditions or events associated with a virtual environment/character to the notification server 17 at predetermined times, time intervals, or responsive to the occurrence of the user-defined condition or event.

The method 20 then proceeds to step 23, where the notification server 17 determines whether the information regarding the occurrence of conditions or events related to a virtual environment/character received from the information source 16 is relevant to any user-defined conditions or events for which a user of the MWCD 14 has requested notification. For instance, the notification server 17 may determine whether the information source 16 has indicated, in response to the notification server's request, that a condition or event related to a virtual environment/character for which a user of the MWCD 14 has requested notification has occurred. The notification server 17 may also compare the information regarding the occurrence of conditions or events received from the information source 16 with the user-defined conditions or events for which a user of the MWCD 14 has requested notification to determine whether the received information matches any of the user-defined conditions or events. If the notification server 17 determines that the information regarding the occurrence of conditions or events related to a virtual environment/character received from the information source 16 is not relevant to any user-defined conditions or events for which a user of the MWCD 14 has requested notification, then the method 20 proceeds back to step 22. On the other hand, if the notification server 17 determines that the information regarding the occurrence of conditions or events is relevant to a user-defined condition or event for which a user of the MWCD 14 has requested notification, then the method 20 proceeds to step 24.

At step 24, the notification server 17 provides a notification to the MWCD 14 that the condition or event associated with the virtual environment/character for which the user of the MWCD 14 requested notification has occurred. The notification server 17 may provide any type of message to the MWCD 14 to notify a user of the MWCD of the occurrence of the condition or event such as, for example, a text message, an electronic mail message, a telephone message, or any other type of message for which the MWCD is capable of receiving. In response to receiving the message from the notification server 17 of the occurrence of the condition or event, the MWCD 14 may display the message from the notification server 17 regarding the occurrence of the condition or event associated with the virtual environment. For example, the MWCD 14 may display a text message from the notification server 17 that a Fantasy Football trade for which the user of the MWCD requested to be notified has occurred. According to exemplary embodiments, the notification server 17 uses information provided by a user of the MWCD 14 via the graphical user interface 50 to determine contact information for where to send the message, format information for how to send the message, and timing information for when to send the information, as discussed further below with regard to FIG. 5.

In addition, the MWCD 14 may provide an output other than, or in addition to, the message provided by the notification server 17. For example, in response to receiving a message from the notification server 17 that a Fantasy Football trade for which the user of the MWCD 14 requested notification has occurred, the MWCD 14 may flash red on the MWCD's display, display a smiley face on the display, or may provide a sound specified by the user of the MWCD to be played upon receipt of a notification from the notification server 17. It should be understood by those skilled in the art that the MWCD 14 may provide any type of visual, audio, tactile, or other type of sensory output in response to receiving a notification from the notification server 17 that a condition or event associated with a virtual environment/character for which the user of the MWCD has requested notification has occurred. From step 24, the method 20 proceeds to step 25, where the method ends.

Figure 3:
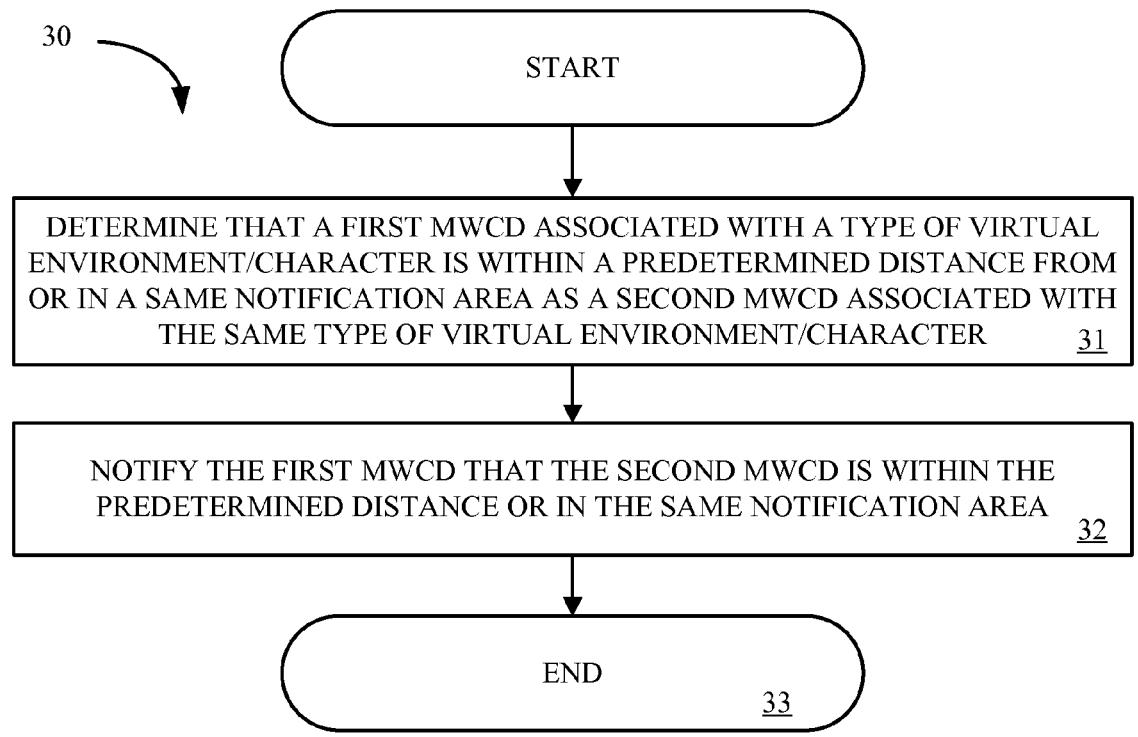

Turning now to FIG. 3, a flow chart illustrating an exemplary embodiment of a method for providing notification to the MWCDs 14 associated with similar virtual environments/characters that are within a predetermined distance from one another and/or within the notification area 19 is provided. As indicated in step 31, the notification server 17 determines that a first MWCD, such as the MWCD 14, associated with a type of virtual environment/character is within a predetermined distance from or in the same notification area 19 as a second MWCD, such as the MWCD 14, associated with the same type of virtual environment/character. For example, the notification server 17 may determine that two MWCDs, such as the first and second MWCDs 14, are associated with the virtual version of the same Webkinz™ toy and are in the same building, or that the first and second MWCDs 14 are associated with the Second Life™ game and are within a predetermined distance of each other. The notification server 17 may determine that the first and second MWCDs 14 are in a certain area, such as the notification area 19, based on information received from the first and second MWCDs. For example, the first and second MWCDs 14 may be GPS enabled and capable of identifying the longitude and latitude coordinates of the first and second MWCDs, and/or the first and second MWCDs may determine their respective locations using triangulation.

The notification server 17 may request location information from the first and second MWCDs 14 using contact information corresponding to the first and second MWCDs stored in the mass storage device 310 of the notification server. The contact information corresponding to the first and second MWCDs 14 may be provided to the mass storage device 310 by a back office server (BOS). For example, a user of the first MWCD 14 may provide contact information corresponding to the first MWCD to a company operating the BOS when the first MWCD user registers with the company to receive notification related to virtual environments/characters. Alternatively or additionally, the first MWCD 14 may provide the notification server 17 with location information at predetermined time intervals and/or responsive to moving into or out of the notification area 19.

The notification server 17 and/or the first MWCD 14 may determine that the first MWCD is within the notification area 19 by comparing coordinates corresponding to the first MWCD with coordinates corresponding to the notification area. The coordinates defining the notification area 19 may be stored in the notification server 17, in a remote database accessed by the notification server via the network 18, and/or in the first MWCD 14. According to exemplary embodiments, the notification server 17 may determine if the first MWCD 14 is within a predetermined distance of the second MWCD 14 by comparing location information, such as coordinates, associated with the first MWCD with coordinates associated with the second MWCD to determine a distance between the two devices and then comparing the determined distance between the two devices with the predetermined distance, which may be stored in the notification server.

Once the notification server 17 determines that the first MWCD 14 is within the notification area 19 or that the first and second MWCDs are within a predetermined distance of one another, the notification server determines whether the first MWCD within the notification area is associated with a virtual environment/character that is the same as, or similar to, a virtual environment/character associated with another MWCD, such as the second MWCD, in the notification area or that the first and second MWCDs within the predetermined distance of one another are associated with the same, or similar, virtual environment/character. To determine a virtual environment/character associated with the first and second MWCDs 14, the notification server 17 may receive identification information from the first and second MWCDs and compare the identification information associated with the first and second MWCDs with identification information stored at the notification server to determine the virtual environments/characters corresponding to the identification information. As further discussed in view of FIG. 5, users of the first and second MWCDs 14 may use the graphical user interface 50 to provide identification information and a virtual environment/character associated with the first and second MWCDs.

When the notification server 17 determines that the first MWCD 14 within the notification area 19 is associated with a virtual environment/character that is the same as, or similar to, a virtual environment/character associated with the second MWCD in the notification area or that the first and second MWCDs within the predetermined distance of one another are associated with the same, or similar, virtual environment/character, the method 30 proceeds to step 32 where the notification sever notifies the first MWCD of the second MWCD within the notification area and/or within a predetermined distance of the first MWCD. According to exemplary embodiments, the notification server 17 notifies the first MWCD 14 of the second MWCD 14 by providing a notification message to the first MWCD that the second MWCD is within the notification area 19 or within a predetermined distance from the first MWCD and is associated with a same or similar virtual environment/character. The notification message may identify the virtual environment/character which the first and second MWCDs 14 have in common. For example, the first MWCD 14 associated with a virtual version of a Webkinz™ toy may receive a text message indicating that the second MWCD 14 user associated with a virtual version of the same Webkinz™ toy is in the same building.

Also, the notification message may include contact information associated with the second MWCD 14 if the second MWCD has authorized the notification server 17 to provide the contact information associated with the second MWCD to other MWCDs. For example, the first MWCD 14 associated with Second Life™ may receive a text message containing the phone number of the second MWCD 14 also associated with Second Life™ and located within a predetermined distance of the first MWCD. If the second MWCD 14 has not authorized the notification server 17 to provide contact information to other MWCDs, the notification server 17 may contact the second MWCD and request authorization from the second MWCD to provide contact information associated with the second MWCD to the first MWCD 14. If the first MWCD 14 has authorized the notification server 17 to provide contact information associated with the first MWCD to other MWCDs, the notification server 17 may send a notification message to the second MWCD 14 including the contact information associated with the first MWCD and indicating that the first MWCD is within the notification area 19 or within a predetermined distance from the second MWCD. The notification server 17 may provide any type of message to the first and/or second MWCDs 14 to notify the user of the first and/or second MWCDs of the existence of the MWCDs within the same notification area 19 or within a predetermined distance of one another such as, for example, a text message, an electronic mail message, a telephone message, or any other type of message for which the MWCDs are capable of receiving. The method 30 then proceeds to step 33, where the method ends.

Figure 4:
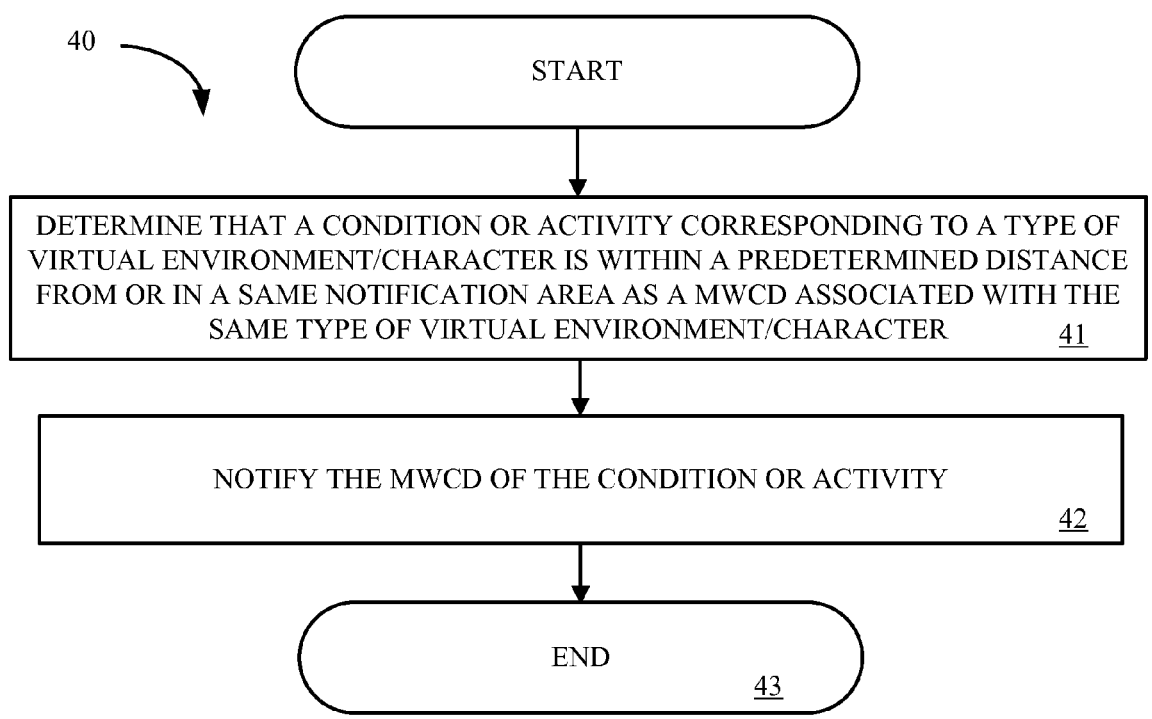

FIG. 4 is a flow chart illustrating a method 40 for enabling notification based on a virtual environment or character, according to exemplary embodiments. As indicated in box 41, the notification server 17 determines that a condition or activity corresponding to a type of virtual environment/character is within a predetermined distance from or in the same notification area 19 as a MWCD, such as the MWCD 14, associated with the same type of virtual environment/character. For example, a user of the MWCD 14 may be shopping in a mall where there is a sale on team paraphernalia relating to the user's Fantasy Football team for which the MWCD 14 is associated, or the MWCD is associated with Second Life™ and the user of the MWCD is passing near a gaming industry convention.

The notification server 17 may receive information about a virtual environment/character condition or activity from the information source 16 or any other available information source capable of providing such information. The information regarding the virtual environment/character condition or activity may include information about what the condition or activity is, such as a sale corresponding to a particular type of virtual character or a convention regarding a particular type of virtual environment; a type of virtual environment/character corresponding to the condition or activity; and a location of the condition or activity, such as coordinates or an address associated with the location. The notification server 17 may determine that a condition or activity corresponding to a type of virtual environment/character is within a predetermined distance from or in the same notification area 19 as the MWCD 14 associated with the same or similar type of virtual environment/character by comparing coordinates corresponding to the MWCD with coordinates corresponding to the condition or activity.

If a determination is made that the MWCD 14 associated with a type of virtual environment/character is within the notification area 19 or a predetermined distance of a virtual environment/character condition or activity associated with the same type of virtual environment/character, the method 40 proceeds to step 42 where the notification server 17 notifies the MWCD 14 of the condition or activity. According to exemplary embodiments, the notification server 17 notifies the MWCD 14 of the virtual environment/character condition or activity by providing a notification message to the MWCD that the condition or activity is within the notification area 19 or within a predetermined distance from the MWCD and is associated with a same or similar virtual environment/character. The notification message may include information regarding what the condition or activity is, the type of virtual environment/character corresponding to the condition or activity, and/or the location of the condition or activity. For example, while at the shopping mall, a user of the MWCD 14 associated with a Fantasy Football team may receive a voice message at the MWCD notifying the user of the MWCD of a sale in a nearby store relating to the same Fantasy Football team. As another example, the MWCD 14 associated with Second Life™ may receive a text message regarding a gaming industry convention associated with Second Life™ when the MWCD is within a predetermined distance from the convention. The notification server 17 may provide any type of message to the MWCD 14 to notify the user of the MWCD of the existence of a condition or activity related to a virtual environment/character associated with the MWCD that is within the same notification area 19 or within a predetermined distance of the MWCD such as, for example, a text message, an electronic mail message, a telephone message, or any other type of message for which the MWCD is capable of receiving. The method 40 then proceeds to step 43, where the method ends.

Note that the methods 20, 30, 40 depicted in the exemplary flow charts described above may be modified to include fewer, additional, and/or different steps within the scope of this disclosure. Furthermore, steps depicted in the flow charts may be performed out of the order shown including substantially concurrently, in reverse order, or in a substantially different order.

FIG. 5 is an exemplary embodiment of the graphical user interface 50 for receiving input related to notification services to be provided to a MWCD, such as the MWCD 14. According to exemplary embodiments, the graphical user interface 50 is provided by the notification server 17 and includes a preference selection area 51 for receiving user input specifying user preferences associated with the notification services provided by the notification server. The preference selection area 51 may include various menus, selection boxes, selection buttons, and/or entry fields for specifying user preference.

The preference selection area 51 of the interface 50 may include an environment/character field 52 for receiving input identifying a virtual environment/character for which a user of the MWCD 14 is to be notified of the happening of conditions or events related to the virtual environment/character. The preference selection area 51 may also include a condition/event field 53 for receiving input defining the conditions or events related to the virtual environment/character identified in the environment/character field 52 for which the user is to be notified. For example, a user of the MWCD 14 may enter input in the character/environment field 52 identifying the ATLANTA FALCONS and Fantasy Football and input in the condition/event field 53 indicating player trades. Therefore, if a trade of a player associated with the ATLANTA FALCONS occurs in the Fantasy Football environment, the notification server 17 would send a notification message to the MWCD 14.

As illustrated in FIG. 5, the preference selection area 51 may include an identification information field 54 for receiving input that identifies the MWCD 14, such as a telephone number, email address, or other unique identifier associated with the MWCD, and/or input that uniquely identifies a user of the MWCD. As discussed above, the notification server 17 may compare identification information received from the MWCD 14 with identification information corresponding to the MWCD input via the identification information field 54 to determine the virtual environments/characters associated with the MWCD 14. The preference selection area 51 may further include a contact information field 59 for receiving contact information corresponding to the MWCD 14, such as a telephone number, electronic mail address, and/or any other information, that can be used to contact the MWCD. As discussed above, the contact information may be used by the notification server 17 to send a notification to the MWCD 14 of the occurrence of conditions or events corresponding to a virtual environment/character associated with the MWCD, the existence of another MWCD within the same notification area 19 or within a predetermined distance of the MWCD, and/or virtual environment/character conditions or activities within the same notification area 19 as the MWCD or within a predetermined distance of the MWCD. The contact information may also be used by other MWCDs 14 associated with the same or similar virtual environments/characters as the MWCD to contact the MWCD.

According to exemplary embodiments, the preference selection area 51 also includes fields, such as a notification output field 55, a notification format field 56, and a notification time field 57, for receiving input related to when and how a user of the MWCD 14 is to be notified by the notification server 17. Input may be provided via the notification output field 55 indicating a type of output the MWCD 14 should provide based on the type and/or content of the notification message received by the MWCD from the notification server 17. For example, a user of the MWCD 14 may specify that the MWCD flash a red light when a notification is received from the notification server 17 that a virtual version of a Webkinz™ toy's health has dropped below a threshold. It should be appreciated by those skilled in the art that the type of output selected by a user corresponding to receiving a notification from the notification server 17 may include any visual, auditory, or tactile output for which the MWCD 14 is capable of producing.

The notification format field 56 may receive input specifying the form of notification message, such as text message, voice message, and/or electronic mail message, to be used by the notification server 17 to notify a user of the MWCD 14 of an occurrence related to a virtual environment/character associated with the MWCD. By providing input via the notification format field 56, the user may also be able to specify different forms of notification to be provided to the MWCD 14 based on the condition or event related to the virtual environment/character that has occurred and/or whether another MWCD associated with the same virtual environment/character or a condition/activity associated with the same virtual environment/character is determined to be within the same notification area 19 or pre-determined distance as the MWCD. For example, a user of the MWCD 14 may indicate that a text message be provided if a virtual version of a Webkinz™ toy is hungry and a voice message be provided if the virtual version of the Webkinz™ toy is sad.

In addition, input may be provided via the notification time field 57 specifying when a user of the MWCD 14 is to receive notifications from the notification server 17. For example, the user may specify whether the notification is to be received substantially immediately after the occurrence of a condition or event associated with a virtual environment/character or whether the notification is to be received at predetermined times or time intervals.

It should be appreciated by those skilled in the art that preferences may be input using the graphical user interface 50 for each virtual environment or character associated with one or more of the MWCDs 14 for which a user requests notification. Accordingly, a user may select to have notifications regarding a first virtual environment or character sent to a first MWCD, such as the MWCD 14, and notifications regarding a second virtual environment or character sent to a second MWCD. Thus, the user may use the graphical user interface 50 to provide customized preferences for each virtual environment or character associated with one or more of the MWCDs 14 of the user.

Figure 6:
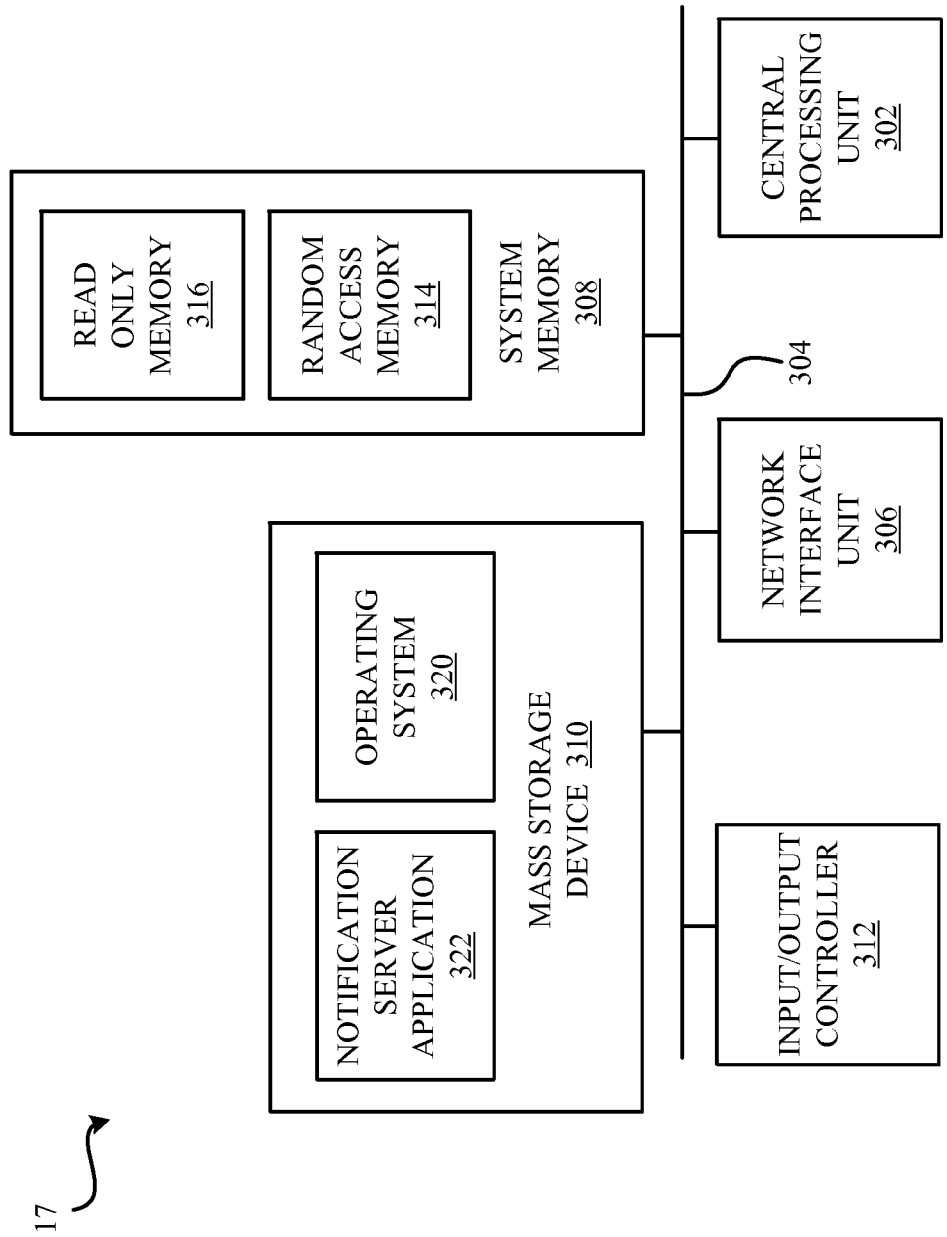
FIG. 6 is a block diagram illustrating a notification server, in accordance with exemplary embodiments.

FIG. 6 is a block diagram illustrating the notification server 17, in accordance with exemplary embodiments. The notification server 17 includes a central processing unit (CPU) 302, a system memory 308, including a random access memory (RAM) 314 and a read-only memory (ROM) 316, and a system bus 304 that couples the memory 308 to the CPU 302. A basic input/output system containing the basic routines that help to transfer information between elements within the notification server 17, such as during startup, is stored in the ROM 316. The notification server 17 further includes a mass storage device, such as the mass storage device 310, for storing an operating system 320 and other program modules, which will be described in greater detail below.

The mass storage device 310 is connected to the CPU 302 through a mass storage controller (not shown) connected to the bus 304. The mass storage device 310 and its associated computer-readable media provide non-volatile storage for the notification server 17. Although the description of computer-readable media contained herein refers to a mass storage device, such as a hard disk or CD-ROM drive, it should be appreciated by those skilled in the art that computer-readable media can be any available media that can be accessed by the notification server 17.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the notification server 17.

The notification server 17 may connect to a network, such as the network 18, through a network interface unit 306 connected to the bus 304. It should be appreciated that the network interface unit 306 may also be utilized to connect to other types of networks and remote computer systems. The notification server 17 may also include an input/output controller 312 for receiving and processing input from a number of other devices, including a keyboard, mouse, or electronic stylus (not shown in FIG. 6). Similarly, the input/output controller 312 may provide output to a display screen, a printer, or other type of output device (also not shown in FIG. 6).

As mentioned briefly above, a number of program modules and data files may be stored in the mass storage device 310 and RAM 314 of the notification server 17, including the operating system 320 suitable for controlling the operation of the notification server 17. The mass storage device 310 and RAM 314 may also store one or more program modules. In particular, the mass storage device 310 and the RAM 314 may store a notification server application 322 configured to provide notifications and information related to virtual environments/characters to the MWCDs 14. The notifications and information related to virtual environments/characters, which may include image, text, and/or voice data, may be provided via, for example, electronic mail messages, text messages, and/or voice messages. Other program modules may also be stored in the mass storage device 310 and utilized by the notification server 17.

According to exemplary embodiments, the notification server application 322 provides notification to the MWCD 14 via the mobile wireless network 18. According to exemplary embodiments, the notification is specific to a virtual character or environment of interest to the user of the MWCD 14. For example, notification may be sent to the MWCD 14 regarding changes in status of a virtual character in a computer-implemented game. According to exemplary embodiments, a notification client application 15 of the MWCD 14 may receive the notification from the notification server application 322 of the notification server 17 and provide an output via the MWCD based on a particular output indicated by a user of the MWCD via the notification output field 55 of the graphical user interface 50. The notification server application 322 may provide different forms of communications to the notification client application 15 including, but not limited to, text messages, voice message, and electronic mail.

The notification server application 322 may provide the MWCD 14 with notification that is based on information received by the notification server 17 from a remote source, such as the information source 16. The information source 16 may be, for example, a user computer, a server, a mobile phone, a personal digital assistant (PDA), or any other information source capable of providing the notification application 322 with information regarding a virtual character or environment.

The notification server application 322 may store information identifying characters, conditions, and/or events for which the MWCD 14 user desires notification in the mass storage device 310 or in a database located remotely from the notification server 17 and accessible via the network 18. Such information may be provided by a user of the MWCD via, for example, the graphical user interface 50 (FIG. 5). The graphical user interface 50 may be provided by either the information source 16 or the notification server application 322, depending on a desired implementation. Furthermore, the graphical user interface 50 may be accessed by the MWCD 14 user via the MWCD or via another device such as a desktop or notebook computer. As discussed above, aspects of the notification specified by the user via the graphical user interface 50 may include, for example, the format of the notification, contact information for the MWCD 14, and/or the type of output corresponding to the notification received from the notification server 17.

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims. Various modifications and changes may be made to the subject matter described herein without following the example embodiments and applications illustrated and described, and without departing from the true spirit and scope of the embodiments, which is set forth in the following claims.

What is claimed is:

1. A method for providing information related to a virtual environment, the method comprising:
    receiving, by a processor, information identifying a condition related to the virtual environment;
    determining, by the processor, that a mobile wireless communication device associated with the virtual environment is within a predetermined distance of the condition;
    in response to determining that the mobile wireless communication device is within the predetermined distance of the condition, providing, by the processor, a notification to the mobile wireless communication device of the condition; and
    receiving, by the processor, input instructing that the notification corresponding to the condition related to the virtual environment be provided to a user of the mobile wireless communication device via a first type of output and that a further notification corresponding to a condition related to a further virtual environment be provided to the user of the mobile wireless communication device via a second type of output.

2. The method of claim 1, wherein determining whether the mobile wireless communication device is within the predetermined distance of the condition comprises:
    determining a location of the condition;
    determining a location of the mobile wireless communication device; and
    comparing the location of the mobile wireless communication device with the location of the condition.

3. The method of claim 1, wherein the notification identifies the virtual environment to which the condition is related, describes what the condition is, and provides a location of the condition.

4. The method of claim 1, further comprising:
    receiving input instructing that the notification corresponding to the condition related to the virtual environment be sent to the mobile wireless communication device via a first form of notification message and that the further notification corresponding to the condition related to the further virtual environment be sent to the mobile wireless communication device via a second form of notification message;
    in response to determining that the condition is related to the virtual environment, then sending the notification to the mobile wireless communication device via the first form of notification message; and in response to determining that the condition is related to the further virtual environment, then sending the further notification to the mobile wireless communication device via the second form of notification message.

5. The method of claim 1, further comprising:
determining whether a further mobile wireless communication device associated with the virtual environment is within a predetermined distance of the mobile wireless communication device; and
in response to determining that the further mobile wireless communication device is within the predetermined distance of the mobile wireless communication device, then providing information regarding the further mobile wireless communication device to the mobile wireless communication device.

6. The method of claim 1, wherein the condition comprises an activity related to the virtual environment occurring at a location.

7. A system for providing information related to a virtual environment, comprising:
a processor; and
memory coupled to the processor, the memory comprising instructions that, when executed by the processor, cause the processor to perform operations comprising:
receiving information identifying a condition related to the virtual environment,
determining that a mobile wireless communication device associated with the virtual environment is within a predetermined distance of the condition,
in response to determining that the mobile wireless communication device is within the predetermined distance of the condition, providing a notification to the mobile wireless communication device of the condition, and
receiving input instructing that the notification corresponding to the condition related to the virtual environment be provided to a user of the mobile wireless communication device via a first type of output and that a further notification corresponding to a condition related to a further virtual environment be provided to the user of the mobile wireless communication device via a second type of output.

8. The system of claim 7, wherein determining whether the mobile wireless communication device is within the predetermined distance of the condition comprises:
determining a location of the condition;
determining a location of the mobile wireless communication device; and
comparing the location of the mobile wireless communication device with the location of the condition.

9. The system of claim 7, wherein the notification identifies the virtual environment to which the condition is related, describes what the condition is, and provides a location of the condition.

10. The system of claim 7, wherein the memory comprises further instructions that cause the processor to perform a method comprising:
receiving input instructing that the notification corresponding to the condition related to the virtual environment be sent to the mobile wireless communication device via a first form of notification message and that the further notification corresponding to the condition related to the further virtual environment be sent to the mobile wireless communication device via a second form of notification message;
in response to determining that the condition is related to the virtual environment, then sending the notification to the mobile wireless communication device via the first form of notification message; and
in response to determining that the condition is related to the further virtual environment, then sending the further notification to the mobile wireless communication device via the second form of notification message.

11. The system of claim 7, wherein the memory comprises further instructions that cause the processor to perform a method comprising:
determining whether a further mobile wireless communication device associated with the virtual environment is within a predetermined distance of the mobile wireless communication device; and
in response to determining that the further mobile wireless communication device is within the predetermined distance of the mobile wireless communication device, then providing further information regarding the further mobile wireless communication device to the mobile wireless communication device.

12. The system of claim 7, wherein the condition comprises an activity related to the virtual environment occurring at a location.

13. A non-transitory computer-readable storage medium having computer-executable instructions stored thereon that, when executed by a computer, cause the computer to perform operations comprising:
receiving information identifying a condition related to a virtual environment;
determining that a mobile wireless communication device associated with the virtual environment is within a predetermined distance of the condition;
in response to determining that the mobile wireless communication device is within the predetermined distance of the condition, providing a notification to the mobile wireless communication device of the condition; and
receiving input instructing that the notification corresponding to the condition related to the virtual environment be provided to a user of the mobile wireless communication device via a first type of output and that a further notification corresponding to a condition related to a further virtual environment be provided to the user of the mobile wireless communication device via a second type of output.

14. The non-transitory computer-readable storage medium of claim 13, wherein determining whether the mobile wireless communication device is within the predetermined distance of the condition comprises:
determining a location of the condition;
determining a location of the mobile wireless communication device; and
comparing the location of the mobile wireless communication device with the location of the condition.

15. The non-transitory computer-readable storage medium of claim 13, wherein the notification identifies the virtual environment to which the condition is related, describes what the condition is, and provides a location of the condition.

16. The non-transitory computer-readable storage medium of claim 13, having further computer-executable instructions stored thereon that, when executed by the computer, cause the computer to perform operations comprising:
receiving input instructing that the notification corresponding to the condition related to the virtual environment be sent to the mobile wireless communication device via a first form of notification message and that the further notification corresponding to the condition related to the further virtual environment be sent to the mobile wireless communication device via a second form of notification message;

in response to determining that the condition is related to the virtual environment, then sending the notification to the mobile wireless communication device via the first form of notification message; and in response to determining that the condition is related to the further virtual environment, then sending the further notification to the mobile wireless communication device via the second form of notification message.

17. The non-transitory computer-readable storage medium of claim 13, having further computer-executable instructions stored thereon that, when executed by the computer, cause the computer to perform operations comprising:

determining whether a further mobile wireless communication device associated with the virtual environment is within a predetermined distance of the mobile wireless communication device; and in response to determining that the further mobile wireless communication device is within the predetermined distance of the mobile wireless communication device, then providing further information regarding the further mobile wireless communication device to the mobile wireless communication device.

18. The non-transitory computer-readable storage medium of claim 13, wherein the condition comprises an activity related to the virtual environment occurring at a location.

* * * * *